United States Patent
Yu et al.

(10) Patent No.: US 10,192,045 B2
(45) Date of Patent: Jan. 29, 2019

(54) ELECTRONIC DEVICE AND METHOD FOR AUTHENTICATING FINGERPRINT IN AN ELECTRONIC DEVICE

(71) Applicant: SAMSUNG ELECTRONICS CO., LTD., Suwon-si, Gyeonggi-do (KR)

(72) Inventors: Dong-Ho Yu, Yongin-si (KR); Jun-Ho Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 134 days.

(21) Appl. No.: 15/292,519

(22) Filed: Oct. 13, 2016

(65) Prior Publication Data

US 2017/0103195 A1    Apr. 13, 2017

(30) Foreign Application Priority Data

Oct. 13, 2015  (KR) .......................... 10-2015-0143123

(51) Int. Cl.
*G06F 21/00* (2013.01)
*G06F 21/32* (2013.01)
*G06F 21/45* (2013.01)

(52) U.S. Cl.
CPC .............. *G06F 21/32* (2013.01); *G06F 21/45* (2013.01)

(58) Field of Classification Search
CPC ................................. G06F 21/32; G06F 21/45
USPC ............................................................ 726/18
See application file for complete search history.

(56) References Cited

U.S. PATENT DOCUMENTS

| | | | |
|---|---|---|---|
| 7,634,117 B2 | 12/2009 | Cho | |
| 2009/0254757 A1* | 10/2009 | Toyama | G10L 17/10 |
| | | | 713/186 |
| 2014/0020090 A1* | 1/2014 | Nada | G06K 9/036 |
| | | | 726/19 |
| 2014/0079300 A1 | 3/2014 | Wolfer et al. | |

FOREIGN PATENT DOCUMENTS

| | | |
|---|---|---|
| KR | 10-0819457 | 4/2008 |
| KR | 10-0888824 | 3/2009 |

* cited by examiner

*Primary Examiner* — Anthony D Brown
(74) *Attorney, Agent, or Firm* — Nixon & Vanderhye P.C.

(57) ABSTRACT

Various embodiments of the present disclosure relate to an electronic device and a method for authenticating a fingerprint in an electronic device, the electronic device performs operations including: performing an authentication process for an input fingerprint based on registered authentication information; when the authentication of the input fingerprint is successfully performed, detecting similarity information of the input fingerprint; storing the detected similarity information in conjunction with an authentication time in a fingerprint information database; and updating the registered authentication information using at least one piece of stored fingerprint information based on the similarity information stored in the fingerprint information database, thereby making it possible to prevent and/or reduce the fingerprint authentication rate from being decreased based on the change of the fingerprint so that security can be maintained.

17 Claims, 10 Drawing Sheets

ELECTRONIC DEVICE AND METHOD FOR AUTHENTICATING FINGERPRINT IN AN ELECTRONIC DEVICE

CROSS-REFERENCE TO RELATED APPLICATION

This application is based on and claims priority under 35 U.S.C. § 119 to Korean Application Serial No. 10-2015-0143123, which was filed in the Korean Intellectual Property Office on Oct. 13, 2015, the disclosure of which is incorporated by reference herein in its entirety.

TECHNICAL FIELD

Various embodiments of the present disclosure relate generally to an electronic device and a method for authenticating a fingerprint in an electronic device.

BACKGROUND

Recently, electronic devices have been developed to include various functions, for example, capturing of a picture or video, Internet communication, and the like, in addition to a simple call function. As electronic devices include various functions, the importance of personal information security is increasing. In particular, personal information security is very important for an electronic device that includes functions, such as Internet financial services and the like, that may cause significantly serious damage when they are illegally used by a stranger. As the importance of security is increasing in relation to an electronic device, various security functions are provided in the electronic device in order to limit the use of other users.

For the security, biological characteristics can be used for user identification, and a security technology using various pieces of biometric information such as a fingerprint, voice, a retina, a face, an iris, and the like has been progressing. Among these various pieces of biometric information, a person's fingerprint pattern is different from another person's, has a low risk of being imitated, and does not change easily during a person's entire life, thus a security technology using the fingerprint is receiving the spotlight.

In order to authenticate a user, the electronic device may previously register and manage a fingerprint in a fingerprint registration process for fingerprint authentication, and may identify whether a fingerprint recognized in a fingerprint authentication process matches the registered fingerprint. When the recognized fingerprint matches the registered fingerprint, the user authentication can be successfully performed.

A user's fingerprint may change over time, especially as the user grows older, and the recognition rate of the fingerprint may be lowered due to factors of a wound, season, weather and the like.

However, the conventional electronic device may not reflect a change in the user's fingerprint when recognizing the fingerprint, thus the recognition rate of the fingerprint can be lowered over time.

Thus, the conventional electronic device may repeatedly request the user to input the user's fingerprint because the fingerprint recognition rate falls and performs a fingerprint authentication operation, or may not smoothly provide a service requested by the user.

SUMMARY

Various example embodiments of the present disclosure provide an electronic device and a fingerprint authentication method in the electronic device, in which the electronic device may build a database of fingerprint information recognized in a fingerprint authentication process and manage the database, and may recognize a fingerprint based on the managed fingerprint information.

In order to address the above-mentioned problems or another problem, one of various example embodiments of the present disclosure may provide an electronic device including: input interface configured to receive an input of a fingerprint, and a controller which, when an authentication for the input fingerprint is successfully performed based on registered authentication information, is configured to control the electronic device to detect similarity information for the input fingerprint, to store the detected similarity information in conjunction with an authentication time in a fingerprint information database, and to update the registered authentication information using at least one piece of stored fingerprint information based on the similarity information stored in the fingerprint information database.

In addition, according to one of various example embodiments of the present disclosure, a method for authenticating a fingerprint in an electronic device may be provided, the method including: performing an authentication process for an input fingerprint based on registered authentication information, when the authentication for the input fingerprint is successfully performed, detecting similarity information for the input fingerprint; storing the detected similarity information in conjunction with an authentication time in a fingerprint information database, and updating the registered authentication information using at least one piece of stored fingerprint information based on the similarity information stored in the fingerprint information database.

An electronic device and a method for authenticating a fingerprint in the electronic device, according to various example embodiments of the present disclosure, may reflect fingerprint information that is minutely changed over time to the registered authentication information so that an authentication rate when the user's fingerprint authentication is performed can be increased, thus it is effective in maintaining security.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
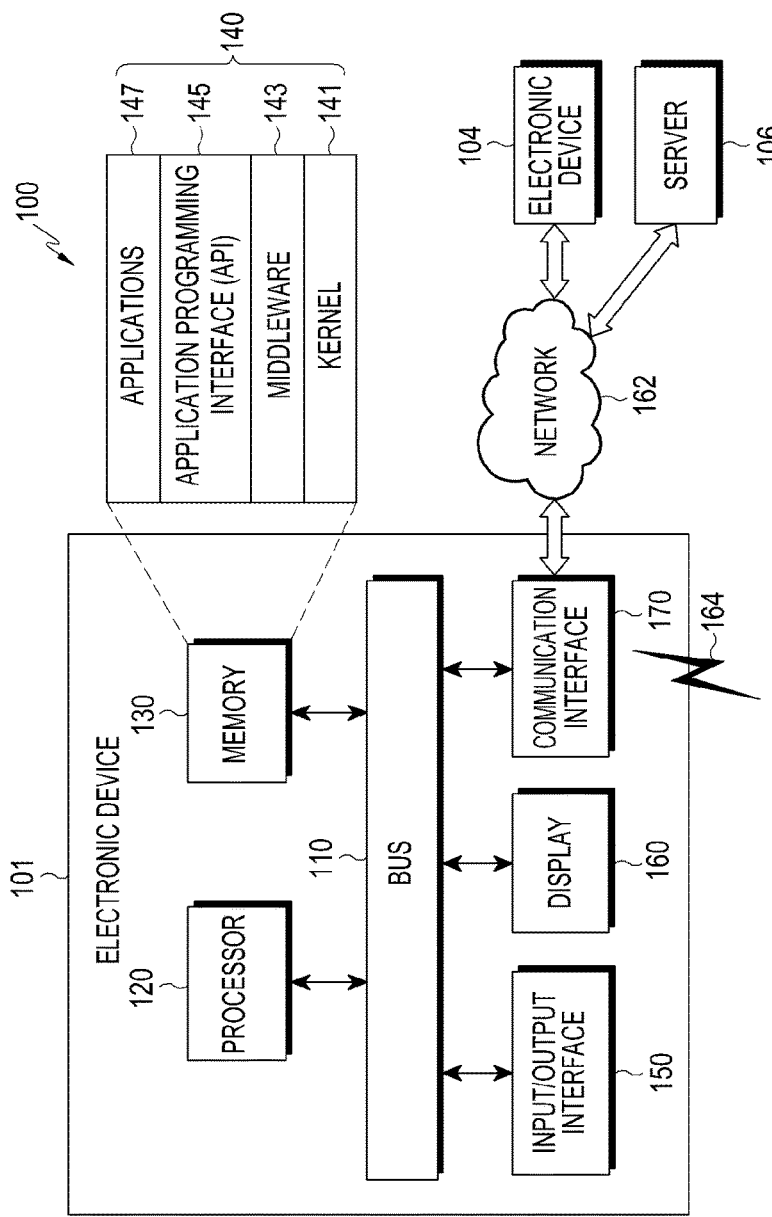
FIG. 1 is a diagram illustrating an example network environment according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to the situation in which the device, together with other devices or components, "is able to". For example, the phrase "processor adapted (or configured) to perform A, B, and C" may refer, for example, to processing circuitry, a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various example embodiments, will be described with reference to FIG. 1. The electronic device 101 may include a bus 110, a processor 120, a memory 130, an input/output interface (e.g., including input/output circuitry) 150, a display 160, and a communication interface (e.g., including communication circuitry) 170. In some embodiments, the electronic device 101 may omit at least one of the elements, or may further include other elements.

The bus 110 may include, for example, a circuit for connecting the components 110 to 170 and transmitting communication (for example, control messages and/or data) between the components.

The processor 120 may include one or more of a Central Processing Unit (CPU), an Application Processor (AP), and a Communication Processor (CP). For example, the processor 120 may carry out operations or data processing relating to the control and/or communication of at least one other element of the electronic device 101.

The memory 130 may include a volatile and/or non-volatile memory. The memory 130 may store, for example, instructions or data relating to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (e.g., the bus 110, the processor 120, the memory 130, etc.) of the electronic device 101 to one or more of the application programs 147. For example, the middleware 143 may perform scheduling or load balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (e.g., instruction) for file control, window control, image processing, text control, etc.

The input/output interface 150 may include various circuitry that may function as, for example, an interface that can forward instructions or data, which are input from a user or an external device, to the other element(s) of the electronic device 101. Furthermore, the input/output interface 150 may include various circuitry configured to output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (for example, text, images, videos, icons, or symbols) to the user. The display 160 may include a touch screen and receive, for example, a touch, gesture, proximity, or hovering input using an electronic pen or the user's body part.

The communication interface 170 may include various circuitry to configure communication, for example, between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wide-band CDMA (WCDMA), Universal Mobile Telecommunications System (UNITS), WiBro (Wireless Broadband), Global System for Mobile Communications (GSM) and the like, for example, as a cellular communication protocol. In addition, the wireless communication may include, for example, short range communication 164. The short range communication 164 may include, for example, at least one of Wi-Fi, Bluetooth, Near Field Communication (NFC), ZigBee, z-wave, or Global Navigation Satellite System (GNSS), etc. The GNSS may include, for example, at least one of a Global Positioning System (GPS), a Global navigation satellite system (Glonass), a Beidou Navigation satellite system (hereinafter, referred to as "Beidou"), Galileo, and the European Global satellite-based navigation system according to a place of usage, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include at least one of a communication network such as a computer network (e.g., a LAN or a WAN), the Internet, and a telephone network.

Each of the first and second external electronic devices 102 and 104 may be of a type that is identical to, or different from, that of the electronic device 101. According to an embodiment, the server 106 may include a group of one or more servers. According to various embodiments of the present disclosure, all or some of operations performed by the electronic device 101 may be performed by another electronic device or multiple electronic devices (e.g., the first and second external electronic devices 102 and 104 or the server 106). According to an embodiment, when the electronic device 101 has to perform some functions or services automatically or in response to a request, the electronic device 101 may request another device (e.g., the electronic device 102 or 104 or the server 106) to perform at least some functions relating thereto instead of, or in addition to, performing the functions or services by itself. Another electronic device (e.g., the electronic device 102 or 104 or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Hereinafter, an electronic device according to various embodiments of the present disclosure will be described with reference to the accompanying drawings.

Figure 2:
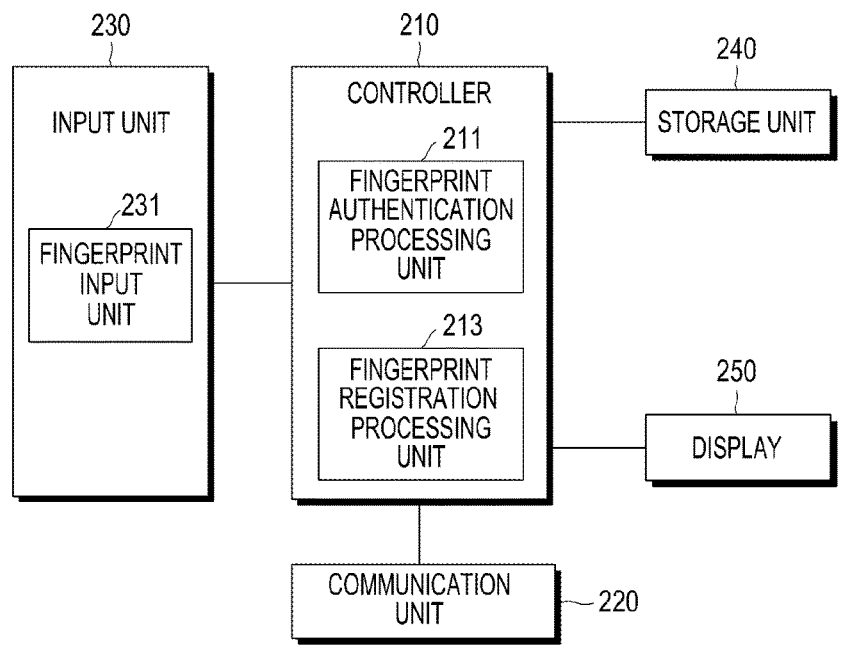
FIG. 2 is a block diagram illustrating an example of a configuration of an electronic device according to various example embodiments of the present disclosure.

FIG. 2 is a block diagram illustrating an example of a configuration of an electronic device according to various example embodiments of the present disclosure.

Referring to FIG. 2, according to various embodiments of the present disclosure, an electronic device (for example, the electronic device 101 of FIG. 1) may include at least one of a controller 210, a communication unit (e.g., including communication circuitry) 220, an input unit (e.g., including input circuitry) 230, a storage unit 240, and/or a display 250. In some embodiments, at least one of the elements of the electronic device may be omitted, or other elements may be additionally included.

According to various embodiments of the present disclosure, the controller 210 (for example, the processor 120 in FIG. 1) may process information according to an operation of the electronic device, a program, an application, or information according to an execution of a function, and may display the processed information on the display 250, or control sound to be output through an audio output unit (not shown).

According to various embodiments of the present disclosure, the controller 210 may control the display 250 to display various types of information (contents) in all or a part of the screen area thereof.

According to various embodiments of the present disclosure, the controller 210 may recognize the user's fingerprint to control operations related to registration and authentication thereof. According to various embodiments, the controller 210 may include at least one of a fingerprint authentication processing unit 211 configured to perform fingerprint recognition for processing an operation associated with the fingerprint recognition and to perform authentication of the recognized fingerprint, and a fingerprint registration processing unit 213 configured to process an operation related to registration in order to register the authenticated fingerprint.

According to various embodiments of the present disclosure, the controller 210 may control such that the registration or authentication of a user's fingerprint is performed using at least some of the plurality of fingerprints that is processed according to the fingerprint recognition operation. To this end, the controller 210 may include at least one of the fingerprint authentication processing unit 211 and the fingerprint registration processing unit 213.

According to various embodiments of the present disclosure, the controller 210 may control such that an input of the user's fingerprint (for example, a fingerprint image) is received using at least one sensor (not shown) provided in the electronic device, the input fingerprint is recognized through the fingerprint authentication processing unit 211, and the recognized fingerprint is authenticated. At least one sensor provided in the electronic device may include at least one of a fingerprint recognition sensor and a camera sensor, but is not limited to this, and may also include various sensors capable of recognizing the fingerprint.

Further, according to various embodiments of the present disclosure, in order to execute a service that can be provided after performing user authentication, the controller 210 may control such that the pre-registration of the user's fingerprint is performed in response to the service. Further, when the fingerprint registration operation is performed, the controller 210 may analyze fingerprint information on the fingerprint input through the fingerprint registration processing unit 213, and may previously register a fingerprint to be used in the fingerprint authentication based on the analyzed fingerprint information. The controller 210 may store, in an authentication information database of the storage unit 240 as authentication information, the fingerprint registered when the fingerprint registration operation is performed through the fingerprint registration processing unit 213, and may manage the same. In order to execute a service, the controller 210 may perform the fingerprint registration operation prior to the fingerprint authentication for authenticating a user and previously register the fingerprint information on the input fingerprint as the authentication information, and may then perform the fingerprint authentication operation according to a request for authenticating a user.

Further, according to various embodiments of the present disclosure, the controller 210 may recognize a fingerprint input in the fingerprint authentication operation for authenticating a user, and when the authentication of the recognized fingerprint is successfully performed, the controller may update the previously registered authentication information using the fingerprint information on the fingerprint for which authentication is successfully performed.

Further, according to various embodiments of the present disclosure, when a service requiring user authentication is executed, the controller 210 may request a fingerprint input, receive an input of the user's fingerprint (for example, a fingerprint image) according to the request, and perform an authentication operation for the input fingerprint. According to various embodiments, the controller 210 may acquire fingerprint information to be authenticated by analyzing the input fingerprint, and may compare the acquired fingerprint information with previously registered authentication information to determine a consistency or a similarity, thereby performing fingerprint authentication. In addition, when the authentication is successfully performed, the controller 210 may store, in the fingerprint information database of the storage unit 240, the fingerprint information (for example, at least one of information associated with analyzed feature points and a fingerprint image) on the input fingerprint. In addition, the controller 210 may control such that information on the consistency or the degree of similarity (for example, a matching score, a similarity rate) acquired when the fingerprint authentication is performed is mapped to the fingerprint information on the input fingerprint and the mapped information is stored. The stored information on the consistency or the degree of similarity may be used in performing an operation for identifying a change of the fingerprint over time.

Further, according to various embodiments of the present disclosure, when the matching score of the authentication processed fingerprint information is included in a predetermined threshold range, the controller 210 may divide an area of the fingerprint image for the recognized fingerprint, redetermine matching scores of remaining areas except for an area having a low degree of similarity by comparing similarities between divided areas, and when the re-determined matching scores are included in a predetermined authentication range, the controller may determine that the authentication is successfully performed.

According to various embodiments of the present disclosure, the controller 210 may acquire feature points of a fingerprint by analyzing the input fingerprint (for example, a fingerprint image), and may store information on the acquired feature points (for example, positions or types of the feature points) as fingerprint information. Further, the controller 210 may identify a similarity by comparing the acquired feature points with feature points (for example, a matching score or a position of the feature point) included in the authentication information on the registered fingerprint, and when the identified similarity is included in a predetermined range (for example, a configured authentication range), the controller may determine that the user authentication is successfully performed. Further, when the identified similarity is out of a predetermined range, the controller 210 may determine as another person's fingerprint and notify the user that the authentication has failed. The similarity may be figured out using similarity information including at least one of a matching score representing the number of feature points to be matched, a similarity rate between fingerprint image shapes, or positions of the feature points.

Further, according to various embodiments of the present disclosure, when the user authentication is performed using the user's fingerprint, the controller 210 may control such that a guide message according to the fingerprint authentication is output as texts or voice through the display 250 or an audio module (not shown).

According to various embodiments of the present disclosure, when new fingerprint information is input to the fingerprint information database, the controller 210 may control such that at least one piece of oldest fingerprint information is deleted, or at least one piece of fingerprint information is deleted after a predetermined time has elapsed. According to various embodiments, the controller 210 may determine and manage an authentication success rate or a failure rate for each time or season, and may manage fingerprint information stored in the fingerprint information database, for example, for a time unit (at least one of day, week, month, year), season, or weather, for which the fingerprint is authenticated. At a time or season during which the authentication success rate is low as a result of identifying the authentication success rate for each time or season, the controller 210 may adjust information (threshold value) configured to identify a change in the authenticated fingerprint over time or information (for example, an authentication range) configured to determine the fingerprint authentication.

Further, according to various embodiments of the present disclosure, the controller 210 may update the authentication information based on the fingerprint information on the fingerprints stored in the fingerprint information database and the authentication therefor is successfully performed, so as to reduce the ratio of incorrectly recognizing the other as the user and not authenticating the user. Accordingly, various embodiments of the present disclosure can prevent the fingerprint recognition rate from being decreased over time by reflecting a change of the fingerprint when the fingerprint authentication is performed, and may increase a fingerprint authentication rate in order to maintain the security.

Hereinafter, an operation of updating the registered authentication information will be described in more detail.

According to various embodiments of the present disclosure, the controller 210 may store, in the fingerprint information database, fingerprint information acquired every time a fingerprint is recognized in a fingerprint authentication operation and similarity information determined using the fingerprint information. Accordingly, various embodiments of the present disclosure may identify a minute change in the user's fingerprint according to at least one of environmental factors (for example, time, season, temperature, humidity, or at least one of a), injury, or aging.

In addition, according to various embodiments of the present disclosure, when a particular event occurs for updating authentication information, the controller 210 may generate authentication information using the similarity information stored in the fingerprint information database, and may update the registered authentication information using the generated authentication information. According to various embodiments, the controller 210 may analyze a change of the fingerprint for which authentication is successfully performed, by using similarity information among, for example, the matching score, the similarity rate or position information of the feature points (coordinate value) stored corresponding to the fingerprint information stored in the fingerprint information database.

The particular event may occur based on at least one of time, surrounding environment, or a user's fingerprint state. For example, the particular event may occur according to one of cases where a predetermined piece of fingerprint information or more is accumulated and stored in the fingerprint information database, where new fingerprint information is stored in the fingerprint information database, where some of the user's registered fingerprint shape or feature points analyzed in the fingerprint area of the wounded area are not consistent with a predetermined number of times or more due to injuries and the like or are not detected, where the similarity of the most recently stored fingerprint information is included in a predetermined range (for example, a range of determining rejection), or a predetermined particular condition (for example, at least one of season, temperature, humidity, a determined time, and a predetermined cycle). Further, the controller 210 may generate authentication information to be updated using all or a part of the fingerprint information stored in the fingerprint information database, based on the detected similarity information among the stored similarity information, or may generate authentication information to be updated using fingerprint information stored for a predetermined time interval.

According to various embodiments of the present disclosure, the controller 210 may identify the stored similarity information (for example, the matching score, the similarity rate or the position of the feature point) corresponding to the fingerprint information stored in the fingerprint information database, and may detect similarity information that is less than or belongs to the threshold value among the identified similarity information. Further, the controller 210 may generate new authentication information using fingerprint information corresponding to the similarity information detected based on the detected similarity information.

Furthermore, according to various embodiments, when the stored particular similarity information is different from the previous similarity information by a predetermined value (or rate) or more, the controller 210 may generate new authentication information using fingerprint information corresponding to the particular similarity information and update the registered authentication information using the generated authentication information. Still furthermore, according to various embodiments, the controller 210 may generate authentication information using the stored at least one piece of fingerprint information every time the particular event occurs, and may update the registered authentication information using the generated authentication information.

In addition, according to various embodiments, the controller 210 may synthesize a part of selected fingerprint information according to the identified change in the fingerprint based on the similarity information, and may register or update the synthesized fingerprint as authentication information for authenticating a user by a fingerprint. In addition, the controller 210 may update the registered authentication information using the fingerprint information analyzed from the fingerprint image of a predetermined radius with reference to a fingerprint area where fingerprint information is the most duplicated in the synthesized fingerprint image.

According to various embodiments of the present disclosure, as a result of analyzing statistical information, when it is determined that a change in a fingerprint is large in a high-humidity season, the controller 210 may set a period for updating the registered authentication information to be shorter. On the other hand, in a dry season, the controller may set a period for updating the registered authentication information to be longer.

According to various embodiments of the present disclosure, the controller 210 may include, for example, a hardware module (e.g., including processing circuitry) and/or a software module (e.g., an application program), which may be hardware elements (functions) or software elements (programs) including at least one of various sensors provided in the electronic device, a data measurement module, an input/output interface, a module that manages the status or environment of the electronic device, or a communication module.

In addition, according to various embodiments of the present disclosure, the controller 210 of the electronic device may be at least a part of a processor, and may include, for example, a combination of one or more of hardware, software, and firmware. According to various embodiments, the controller 210 may omit at least some of the elements, or may be configured to further include other elements for performing an image processing operation in addition to the above elements.

In addition, according to various embodiments of the present disclosure, at least some elements of the controller 210 of the electronic device may include, in hardware, at least some of at least one processor including a Central Processing Unit (CPU)/Micro Processing Unit (MPU), a memory (for example, a register and/or a Random Access Memory (RAM) to which at least one piece of memory loading data is loaded, and a bus for inputting/outputting at least one piece of data to the processor and the memory. Further, the controller 210 may include, in software, a predetermined program routine or program data that is loaded to the memory from a predetermined recording medium to perform a function defined in the electronic device and operation-processed by the processor.

According to various embodiments of the present disclosure, the communication unit 220 of the electronic device (for example, the communication interface 170 of FIG. 1) may include various communication circuitry configured to communicate with another electronic device or an external device (for example, the electronic device 102 or 104 of FIG. 1 or the server 106) under the control of the controller 210. According to various embodiments, the communication unit 220 may include various circuitry configured to transmit/receive data associated with operations executed under the control of the controller 210 to/from the external device. The communication unit 220 may connect to a network using wireless communication or wired communication via the communication interface or may communicate through a connection between devices. The wireless communication may include at least one of, for example, Wi-Fi, Bluetooth (BT), ZigBee, z-wave, Near Field Communication (NFC), Global Positioning System (GPS) and cellular communication (for example, LTE, LTE-A, CDMA, WCDMA, UMTS, WiBro, GSM or the like). The wired communication may include, for example, at least one of a Universal Serial Bus (USB), a High Definition Multimedia Interface (HDMI), a Recommended Standard 232 (RS-232), a Plain Old Telephone Service (POTS), a Universal Asynchronous Receiver Transmitter (UART), an Inter-Integrated Circuit (I2C), a Serial Peripheral Interface (SPI), or a Controller Area Network (CAN). In addition, the communication unit 220 may include all types of communication schemes that have been widely known or will be developed in the future, as well as the aforementioned communication schemes.

According to various embodiments of the present disclosure, the communication unit 220 may be connected to at least one peripheral device (for example, the electronic device 102 or 104 of FIG. 1) capable of performing short-range wireless communication to perform the short-range wireless communication.

According to various embodiments of the present disclosure, the communication unit 220 may include various communication circuitry configured to transmit and receive information to be used for authenticating a fingerprint to and from at least one peripheral device under the control of the controller 210. According to various embodiments, the communication unit 220 may receive a fingerprint (for example, a fingerprint image) input to a peripheral device, such as a wearable device. In addition, according to various embodiments, the communication unit 220 may receive, from an external device, information to be used for the statistical processing of fingerprint information accumulated for fingerprint authentication.

According to various embodiments of the present disclosure, the input unit 230 of the electronic device (for example, the input/output interface 150 of FIG. 1) may include various input interface configured to transfer, to the controller 210, various pieces of information, such as number and character information input from the user, various function settings, and signals that are input in connection with a control of functions of the electronic device. In addition, the input unit 230 may include various input interface for supporting a user input for executing a module or an application for supporting a particular function. The input unit 230 may include various input interface, such as, for example, and without limitation, at least one of a key input means, such as a keyboard or a keypad, a touch input means, such as a touch sensor or a touch pad, a sound source input means, a camera, or various sensors, and may include a gesture input means. In addition, the input unit 230 may include all types of input interface which are being developed currently or will be developed in the future. Further, according to various embodiments of the present disclosure, the input unit 230 may receive information input by the user through the touch panel on the display 250 or the camera, and may transfer the input information to the controller 210.

According to various embodiments of the present disclosure, the input unit 230 may include various interface configured to transfer information related to the user's gesture received from the camera or various sensors to the controller 210. In addition, the input unit 230 may transfer an input signal according to the selection of at least one object (e.g., content) displayed on the screen to the controller 210. In addition, the input unit 230 may receive an input signal for mode switching from the user through the sound source input means, and may transfer the input signal to the controller 210.

In addition, according to various embodiments of the present disclosure, the input unit 230 may include a fingerprint input unit 231 which includes various input interface configured to receive the user's fingerprint detected through at least one sensor provided in the electronic device 101. The input unit 230 may transfer the fingerprint input from the user to the controller 210. The fingerprint input unit 231 may include at least one of a fingerprint recognition sensor and a camera sensor, but is not limited thereto, and may include various sensors that can detect the fingerprint.

According to various embodiments of the present disclosure, the storage unit 240 (for example, the memory 130 in FIG. 1) of the electronic device may temporarily store not only a program necessary for operating functions according to various embodiments but also various data generated while executing the program. The storage unit 240 may largely include a program area and a data area. The program area may store pieces of information related to driving the electronic device, such as an Operating System (OS) that boots the electronic device. The data area may store transmitted/received data or generated data according to various embodiments. Further, the storage unit 240 may include at least one storage medium of a flash memory, a hard disk, a multimedia card micro type memory (for example, an SD or XD memory), a RAM, and a ROM.

According to various embodiments of the present disclosure, the storage unit 240 may store information associated with an application for fingerprint recognition, fingerprint registration, or fingerprint authentication, store the fingerprint input from the user upon registering the fingerprint, and store information on the result of a processing for the input fingerprints. In addition, the storage unit 240 may temporarily store fingerprint information on the fingerprint recognition processed fingerprint, and when the recognized fingerprint information is successfully authenticated, the storage unit may store the corresponding fingerprint information. The storage unit 240 may include at least one of an authentication information database where the registered authentication information is stored and a fingerprint information database where the authenticated fingerprint information is accumulated and managed.

According to various embodiments of the present disclosure, the display 250 of the electronic device (for example, some configurations of the input/output interface 150 or the display 160 of FIG. 1) may output operation execution result information (e.g., at least one of text, an image, or a video) under the control of the controller 210.

According to various embodiments of the present disclosure, the display 250 may display an input pad (e.g., buttons) capable of inputting at least one of various texts, numbers, or symbols in an input window on the screen in various ways. Further, the display 250 may display a service execution screen according to an execution of various applications related to information transmission/reception.

Further, according to various embodiments of the present disclosure, when the display 250 of the electronic device is implemented in the form of a touch screen, the touch screen may correspond to a touch screen of the input unit (not shown). When the display 250 is implemented in the form of a touch screen together with the input unit 230, the display unit 240 may display various pieces of information generated according to a user's touch action.

Further, according to various embodiments of the present disclosure, the display 250 of the electronic device 101 may display an execution screen for an application that is executed for the fingerprint registration or fingerprint authentication, and may display, on the execution screen for the executed application, at least one of a fingerprint image corresponding to the user's fingerprint input through the input unit 230, fingerprint registration guide information, or fingerprint authentication guide information. According to various embodiments, the display 250 may display a fingerprint image corresponding to an input fingerprint every time when the controller 210 receives the input of the user's fingerprint.

In addition, according to various embodiments, the display 250 of the electronic device may include at least one of a Liquid Crystal Display (LCD), a Thin Film transistor LCD (TFT-LCD), an Organic Light Emitting Diodes (OLEDs), LED, Active Matrix OLED (AMOLED), a flexible display, and a 3 dimensional display. Some of the displays may be implemented in a transparent type or a light transmission type so that the outside can be seen therethrough. The display may be implemented in a transparent display form including Transparent OLED (TOLED).

In addition, according to various embodiments of the present disclosure, the electronic device 101 may further include another display (e.g., an extended display or a flexible display) mounted thereon other than the display 250, and a display of an external another electronic device (for example, at least one of an external display device, a wearable device, or an external terminal device) that interacts with the electronic device.

According to various embodiments of the present disclosure, the electronic device may further include an audio module (not shown) (e.g., the input/output interface 150 of FIG. 1). The audio module may output sound and include, for example, at least one of an audio codec, a microphone (MIC), a receiver, an earphone output (EAR_L), or a speaker. According to various embodiments, when voice information corresponding to event information transmitted to a peripheral device (e.g., a cover 220) using the short-range wireless communication is identified, the audio module may output the identified voice information. Further, according to various embodiments, the audio module may output various pieces of voice information for the short-range wireless communication.

Further, according to various embodiments of the present disclosure, the electronic device may further include a means for outputting a vibration or a means for outputting smell.

As described above, various embodiments of the present disclosure have been described for main elements of the electronic device through the electronic device of FIG. 2, but in various embodiments of the present disclosure, not all the elements illustrated through the FIG. 2 are prerequisites, and the electronic device may be implemented to include more or fewer elements than illustrated. In addition, through FIG. 2, the positions of the main elements of the electronic device may be changed according to various embodiments.

An electronic device according to one of various embodiments of the present disclosure may include an input interface configured to receive an input of a fingerprint, and a controller which, when an authentication for the input fingerprint is successfully performed based on registered authentication information, is configured to control the electronic device to detect similarity information for the input fingerprint, store the detected similarity information in conjunction with an authentication time in a fingerprint information database, and update the registered authentication information using at least one piece of stored fingerprint information based on the similarity information stored in the fingerprint information database.

According to various embodiments of the present disclosure, the electronic device may further include a memory configured to store fingerprint information and similarity information of a fingerprint for which authentication is successful, every time the fingerprint authentication is performed, in conjunction with the authentication time in the fingerprint information database.

According to various embodiments of the present disclosure, the controller may determine a matching score by comparing positions of feature points included in the authentication processed fingerprint information with positions of feature points included in the authentication information, and may determine that the recognized fingerprint is successfully authenticated when the determined matching score is included in a predetermined authentication range.

According to various embodiments of the present disclosure, the controller may delete the oldest fingerprint information stored in the database every time when the authenticated fingerprint information is stored in the database, and may perform statistical processing of fingerprint information accumulated in the database.

According to various embodiments of the present disclosure, the similarity information may include at least one of a matching score that is acquired by comparing fingerprint information for the authenticated fingerprints with the registered authentication information, a similarity rate, or a position of a feature point.

According to various embodiments of the present disclosure, the controller may detect the lowest degree of similarity information or similarity information lower than a threshold value among multiple pieces of similarity information that is stored in a fingerprint authentication database, and may generate new authentication information to update the registered authentication information by using at least one piece of fingerprint information selected based on the detected similarity information.

According to various embodiments of the present disclosure, when an event occurs in order to update the registered authentication information according to at least one of time, a surrounding environment, or a user's fingerprint state, the controller may generate new authentication information to update the registered authentication information based on the multiple pieces of similarity information stored in the database.

According to various embodiments of the present disclosure, the controller may generate authentication information to update the registered authentication information by using fingerprint information within a predetermined authentication time interval with reference to fingerprint information corresponding to the similarity information.

According to various embodiments of the present disclosure, the controller may synthesize fingerprint information selected as a result of the identification, and may generate new authentication information using fingerprint information that is analyzed from the fingerprint image of a predetermined radius with reference to a fingerprint area where fingerprint information is the most duplicated in the synthesized fingerprint image.

According to various embodiments of the present disclosure, when the matching score of the authentication processed fingerprint information is included in a predetermined threshold range, the controller may divide an area of the fingerprint image for the recognized fingerprint, redetermine matching scores of remaining areas except for an area having a low degree of similarity by comparing similarities between divided area, and determine that the authentication is successfully performed when the re-determined matching scores are included in a predetermined authentication range.

According to various embodiments of the present disclosure, the controller may configure authentication information to be updated in a direction where the most accumulated feature points change among the fingerprint information accumulated in the database, and may control such that the registered authentication information is updated using the configured authentication information.

Figure 3:
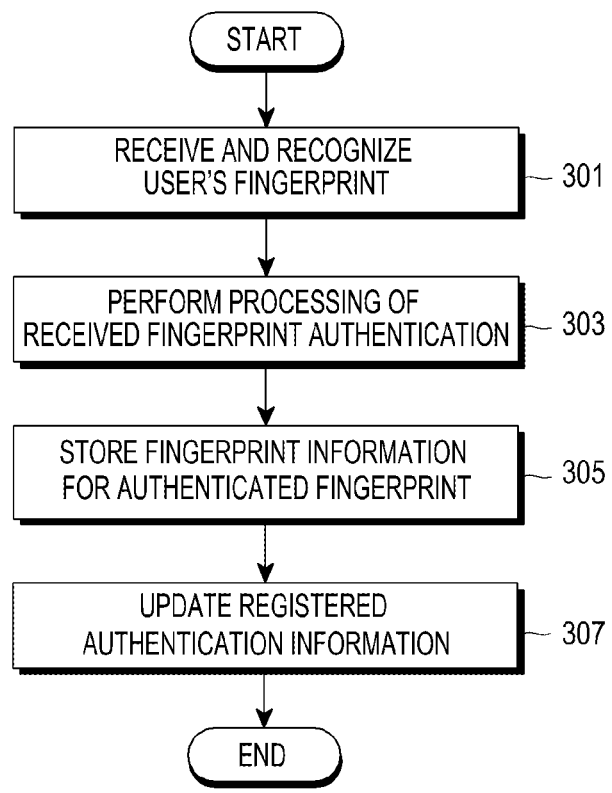
FIG. 3 is a flowchart illustrating an example operation procedure of an electronic device according to various example embodiments of the present disclosure.
Figure 4:
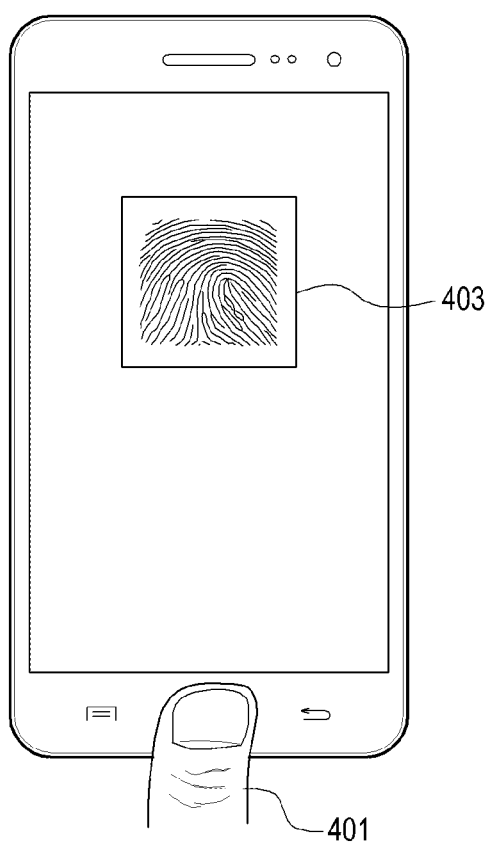
FIG. 4 is a diagram illustrating an example screen for fingerprint authentication in an electronic device according to various example embodiments of the present disclosure.

FIG. 3 is a flowchart illustrating an example operation procedure of an electronic device according to various example embodiments of the present disclosure. FIG. 4 is a diagram illustrating an example of a screen in an electronic device according to various example embodiments of the present disclosure.

Referring to FIGS. 3 and 4, according to an example embodiment of the present disclosure, when the user inputs a fingerprint (indicated by reference numeral 401) at a predetermined area of the electronic device as illustrated in FIG. 4, the electronic device (for example, the electronic device 101 of FIG. 1) may receive an input of the user's fingerprint detected through at least one sensor located at the predetermined area of the electronic device, in operation 301.

In addition, in operation 301, the electronic device may temporarily store the input fingerprint and perform a fingerprint recognition process for the temporarily stored fingerprint. The operations 301 and 303 may be repeatedly performed according to a progress of the fingerprint authentication. According to various embodiments, the electronic device may extract direction component data of a fingerprint shape by analyzing the input fingerprint, and may perform binarization of the extracted direction component data to segment the binarized data so that the input fingerprint can be recognized. In addition, as illustrated in FIG. 4, the electronic device may generate a fingerprint image 403 corresponding to the recognized fingerprint. According to various embodiments, the electronic device may display the generated fingerprint image 403. According to various embodiments, the electronic device may process such that the recognized fingerprint can be seen more clearly by reflecting an environmental factor when the user enters the fingerprint. According to various embodiments, the electronic device may identify feature points from the generated fingerprint image 403 and acquire the identified feature points as fingerprint information.

In operation 303, the electronic device may perform authentication of the input fingerprint by comparing the authentication information with the fingerprint information acquired by the electronic device. According to various embodiments, the electronic device may check the similarity by comparing the positions of feature points included in the registered authentication information with the acquired feature points. According to various embodiments, when a fingerprint for fingerprint authentication is previously registered and then the fingerprint authentication is performed for the first time, the electronic device may compare the fingerprint information on the input fingerprint with the authentication information registered in the fingerprint registration operation. When it is not the first time fingerprint authentication, the registered authentication information may be authentication information updated using the fingerprint information on the fingerprints for which the fingerprint authentication is successfully performed, through the fingerprint authentication for a predetermined time, and then stored.

In operation 305, the electronic device may store the fingerprint information on the fingerprint in a fingerprint information database according to a result obtained by the authentication processing of the input fingerprint, and may identify the change in the fingerprint over time using the similarity information on the fingerprints for which authentication is successfully performed and stored on the fingerprint information database.

In operation 307, the electronic device may generate new authentication information based on a result obtained by identifying the change of the fingerprint, and may update the registered authentication information using the generated authentication information.

A method for authenticating a fingerprint in an electronic device according to one of various embodiments of the present disclosure may include: performing of an authentication process for an input fingerprint based on registered authentication information; when the authentication for the input fingerprint is successfully performed, detecting similarity information for the input fingerprint; storing the detected similarity information in conjunction with an authentication time in a fingerprint information database; and updating the registered authentication information using the stored at least one piece of fingerprint information based on the similarity information stored in the fingerprint information database.

According to various embodiments of the present disclosure, the controller may determine a matching score by comparing positions of feature points included in the authentication processed fingerprint information with positions of feature points included in the authentication information, and determine that the recognized fingerprint is successfully authenticated when the determined matching score is included in a predetermined authentication range.

According to various embodiments of the present disclosure, the method further includes: deleting the oldest fingerprint information stored in the database every time when the authenticated fingerprint information is stored in the database.

According to various embodiments of the present disclosure, the similarity information includes at least one of a matching score that is acquired by comparing fingerprint information for the authenticated fingerprints with the registered authentication information, a similarity rate, or a position of a feature point.

According to various embodiments of the present disclosure, the updating of the registered authentication information may include: detecting the lowest degree of similarity information or similarity information lower than a threshold value among multiple pieces of similarity information that is stored in a fingerprint authentication database; and generating new authentication information to update the registered authentication information by using at least one piece of fingerprint information selected based on the detected similarity information.

According to various embodiments of the present disclosure, the updating of the registered authentication information may include: when an event occurs in order to update the registered authentication information according to at least one of time, surrounding environment, or a user's fingerprint state, generating new authentication information to update the registered authentication information based on the multiple pieces of similarity information stored in the database.

According to various embodiments of the present disclosure, the updating of the registered authentication information may include: selecting of fingerprint information for generating new authentication information, wherein the selected fingerprint information is at least one of the most recently stored information, at least one piece of fingerprint information stored for a predetermined time, fingerprint information corresponding to similarity information having the lowest degree of similarity that is stored for a predetermined time, or fingerprint information corresponding to similarity information having a higher frequency for a predetermined time.

According to various embodiments of the present disclosure, the updating of the registered authentication information may include: generating authentication information to update the registered authentication information by using fingerprint information within a predetermined authentication time interval with reference to fingerprint information corresponding to the similarity information.

According to various embodiments of the present disclosure, the performing of the authentication process for a recognized fingerprint may include: when a matching score of the authentication processed fingerprint information is included in a predetermined threshold value range, dividing an area of the fingerprint image for the recognized fingerprint; comparing similarities between divided areas to redetermine matching scores of remaining areas except for an area having a low degree of similarity; and when the re-determined matching score is included in the authentication range, determining that the authentication is successfully performed.

Hereinafter, various example embodiments of the present disclosure will be described in greater detail below, with reference to drawings to be described later, based on the configuration and operations of the electronic device as described above.

Figure 5:
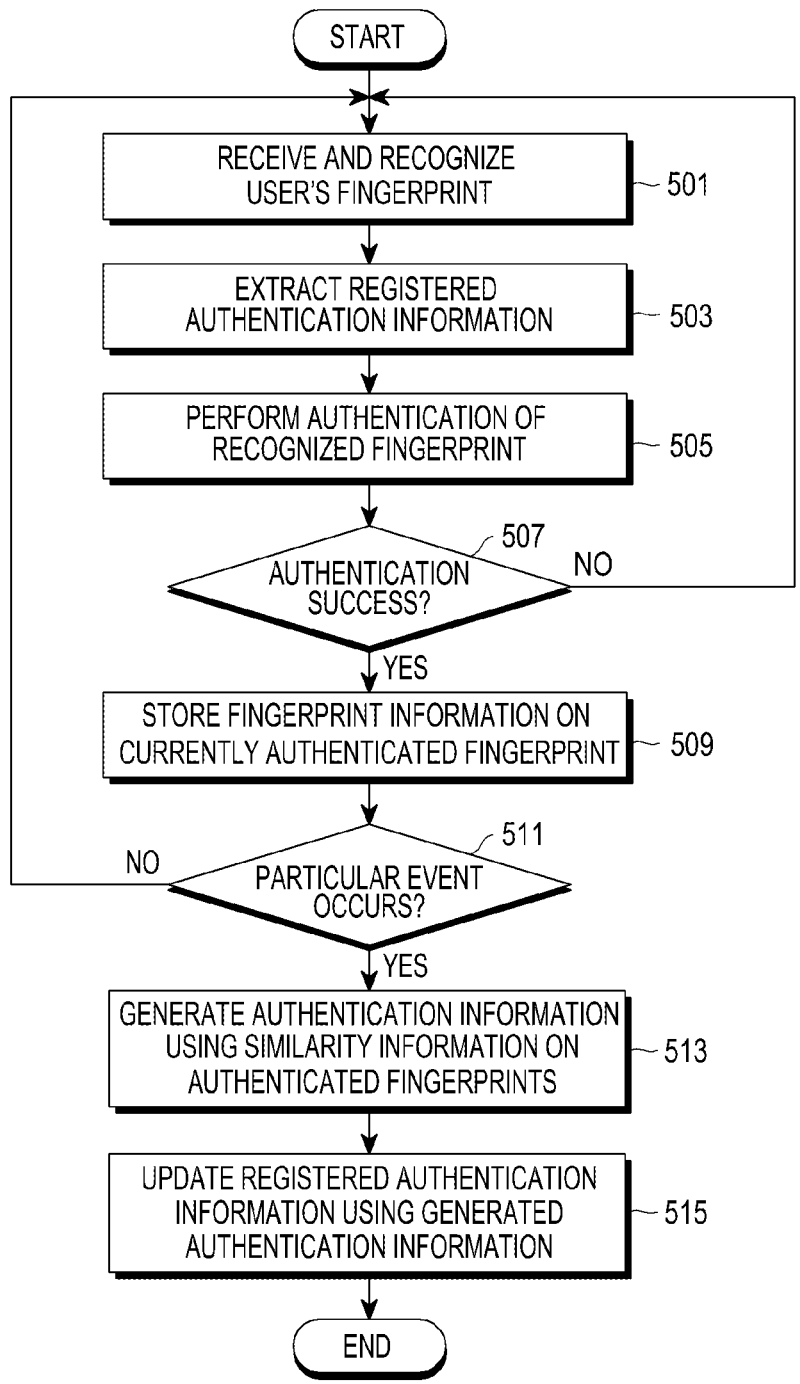
FIG. 5 is a flowchart illustrating an example operation procedure of an electronic device according to various example embodiments of the present disclosure.
Figure 6:
FIG. 6 is a diagram illustrating example fingerprint recognition of an electronic device according to various example embodiments of the present disclosure.

FIG. 5 is a flowchart illustrating an example operation procedure of an electronic device according to various example embodiments of the present disclosure, and FIG. 6 is a diagram illustrating example fingerprint recognition of the electronic device according to various example embodiments of the present disclosure.

Referring to FIG. 5 and FIG. 6, according to an embodiment of the present disclosure, when the user executes a service requiring user authentication, the electronic device (for example, the electronic device 101 of FIG. 1) may make a request for a fingerprint input for the user authentication.

As the user inputs a fingerprint, in operation 501, the electronic device may detect the user's fingerprint through at least one sensor located at the predetermined area and receive an input of the detected fingerprint. In addition, as illustrated in FIG. 6, the electronic device may extract direction component information 601 by analyzing the input fingerprint (for example, a fingerprint image), and may perform binarization (indicated by reference numeral 603) of the extracted direction component information and segment the binarized fingerprint shape (indicated by reference numeral 605) so as to shape the fingerprint corresponding to the direction component information and recognize the fingerprint.

In operation 503, the electronic device may extract the registered authentication information. The registered authentication information may be authentication information that is registered in the fingerprint registration operation or authentication information that is updated by using the stored fingerprint information.

Figure 7:
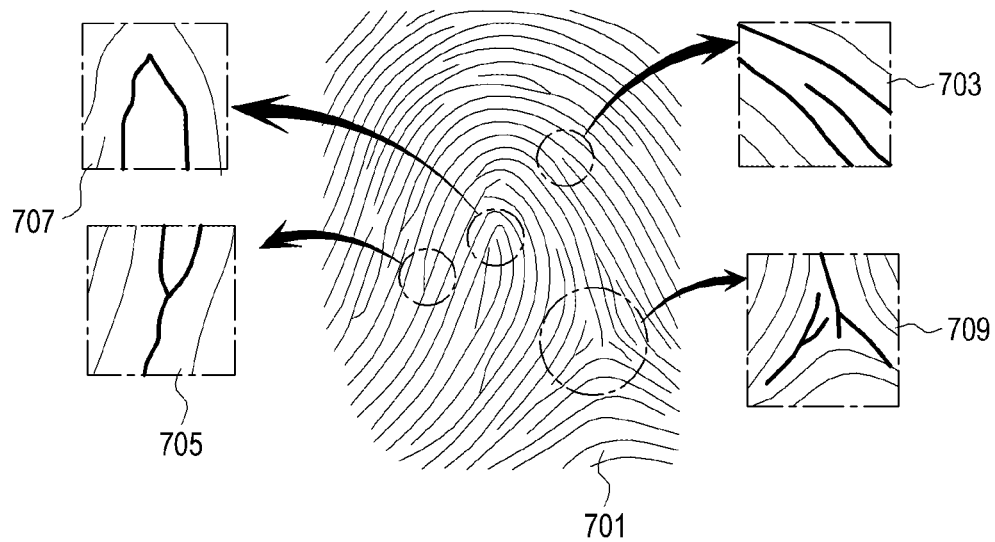
FIG. 7 is a diagram illustrating example fingerprint recognition of an electronic device according to various example embodiments of the present disclosure.

In operation 505, the electronic device may detect, from the recognized fingerprint image, fingerprint information to be authenticated that is, feature points, as illustrated in the accompanying FIG. 7. The feature points detected from the fingerprint image 701 may be at least one of, for example, an end point 703 where a ridge is disconnected, a branch point 705 where the ridge is split, a core point 707 where the ridge has the sharpest curvature in the up and down directions, or a delta point 709 where the flow of the ridge of the fingerprint gathers at three directions.

Figure 8:
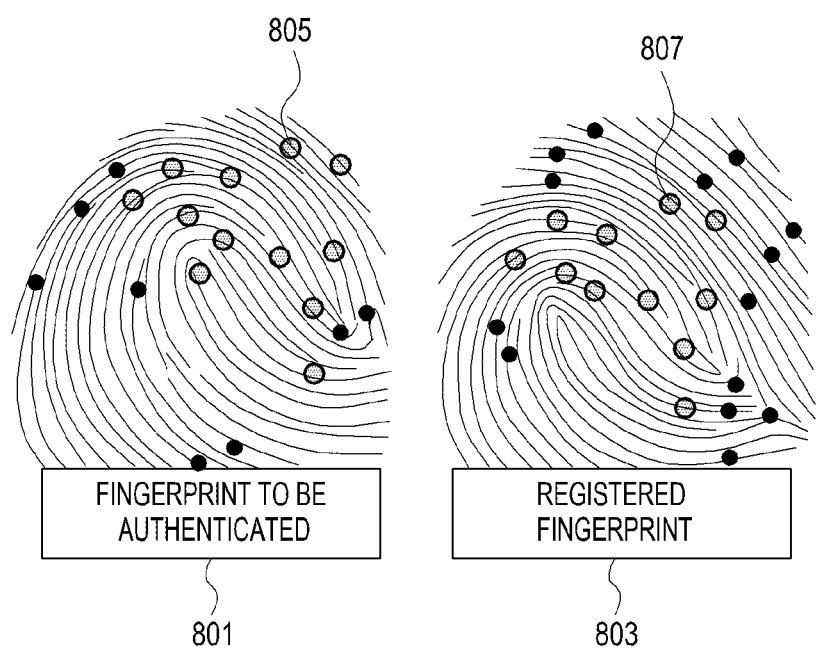
FIG. 8 is a diagram illustrating example fingerprint authentication of an electronic device according to various example embodiments of the present disclosure.

In addition, as illustrated in the accompanied FIG. 8, the electronic device may compare the authentication information of the registered fingerprint image 803 with the fingerprint information detected from the recognized fingerprint image 801. According to various embodiments, the electronic device may determine the similarity by comparing positions of the feature points 805 of the recognized fingerprint image 801 and positions of the feature points 807 of the registered fingerprint image 803, and may determine whether the input fingerprint belongs to the same person that is, the authentication thereof is successfully performed based on the determined similarity, in operation 507. The similarity may be determined using the matching scores representing the number of matching feature points, positions of the feature points, or a matching degree of the fingerprint image shape.

In operation 507, the electronic device may identify whether the authentication of the input fingerprint is successfully performed based on a result obtained by comparing the extracted authentication information with the fingerprint information of the input fingerprint. When the similarity is not included in a predetermined range (a range of authentication rejection) based on an authentication success rate and an authentication failure rate, the electronic device may determine that the authentication is successfully performed.

As a result of identification, when the fingerprint authentication is successfully performed, the electronic device may perform an operation 509, and when the fingerprint authentication is not successfully performed, the process proceeds again to operation 501 and the electronic device may receive a new fingerprint.

In operation 509, since the input fingerprint authentication is successfully performed, the electronic device may store, in a fingerprint information database, the fingerprint information (for example, a fingerprint image or the location and type of the feature point of the fingerprint image) detected from the input fingerprint.

In operation 511, the electronic device may identify whether a particular event for identifying a change in the fingerprint with time occurs or not. The particular event for identifying the change in the fingerprint with time may occur according to at least one of cases where a predetermined piece of fingerprint information or more is accumulated and stored in the fingerprint information database, where new fingerprint information is stored in the fingerprint information database, where some of the user's registered fingerprint shape or feature points analyzed in the fingerprint area of the wounded area are not consistent with a predetermined number of times or more due to injuries and the like or are not detected, where the similarity of the most recently stored fingerprint information is included in a predetermined range, or a predetermined particular condition (for example, at least one of season, temperature, humidity, a determined time, and a predetermined cycle). In addition, the controller 210 may control such that an operation for identifying the change of the fingerprint according to an authentication time is performed using a part or all the fingerprint information stored in the fingerprint information database, or an operation for identifying the change of the fingerprint according to an authentication time is performed using the fingerprint information stored for a predetermined time interval.

As a result of identifying whether the particular event occurs in operation 511, when the particular event does not occur, the electronic device may perform again the operation 501.

As a result of identifying whether the particular event occurs in operation 511, when the particular event occurs, the electronic device may generate authentication information based on the similarity information stored in conjunction with an authentication time in the fingerprint information database information, in operation 513. The electronic device may identify the similarity information (for example, the matching score, the similarity rate or the position of the feature point) stored corresponding to the fingerprint information stored in the fingerprint information database, and when the identified similarity information belongs to a predetermined condition for example, the identified similarity information is less than the threshold value or belongs within the threshold range, the electronic device may generate new authentication information based on the selected fingerprint information. The selected fingerprint information may be at least one of the most recently stored information, at least one piece of fingerprint information stored for a predetermined time, fingerprint information corresponding to similarity information having the lowest degree of similarity that is stored for a predetermined time, or multiple pieces of fingerprint information corresponding to similarity information having a higher frequency for a predetermined time.

According to various embodiments, the electronic device may identify the similarity information on the authenticated fingerprint, and when there is similarity information that belongs within a threshold range or lower than the predetermined threshold value, the electronic device may determine that there is a change in the fingerprint of the same person. The threshold value or the threshold range may be a value (for example, a similarity rate: 45%) that is set higher than the lowest degree of similarity information for which the authentication is successfully performed or a predetermined range (for example, a similarity rate: 45%~50%) with reference to the lowest degree of similarity information. For example, as illustrated in <Table 1> below, if the threshold value is set to 45%, the electronic device may detect 43% of similarity information lower than the threshold value, and may generate authentication information to update the registered authentication information using the #n fingerprint information because a change in the fingerprint for the #n fingerprint information that is authenticated at time tn corresponding to the detected 43% similarity information is large compared to the registered fingerprint.

In addition, according to various embodiments, the electronic device may detect at least one piece of similarity information that shows a sharp difference that is higher than a predetermined rate among the authenticated fingerprints, and may generate authentication information to update the registered authentication information based on the detected similarity information. For example, as illustrated in <Table 1> below, since the similarity information (43%) of #n fingerprint information at the authentication time tn has a sharp difference of 10% or more compared to the similarity information (50%) of the #n−1 fingerprint information at authentication time tn−1, the change in the fingerprint for the #n fingerprint information is large compared to the registered fingerprint so that the electronic device may generate new authentication information using the #n fingerprint information.

Further, according to various embodiments, the electronic device may detect, among the stored similarity information, a predetermined range of similarity information, similarity information having a higher frequency for a predetermined authentication time interval, or the lowest degree of similarity information, and may generate new authentication information using the fingerprint information corresponding to the detected similarity information. For example, in <Table 1> below, the electronic device may detect the degree of similarity information (50%) of tn−1 having the lowest degree of similarity information from t4 to tn−1 interval, and may generate new authentication information using the fingerprint information of tn−1 corresponding to the detected similarity information.

feature points. The generated authentication information may be generated by configuring the shape of the fingerprint image based on the detected feature points or synthesizing the fingerprint images based on the accumulated fingerprint information.

In addition, according to various embodiments, the electronic device may generate a fingerprint image using feature points accumulated a lot over time, based on the position information of feature points for fingerprint information, and may configure authentication information including the generated fingerprint image and information that analyzes the fingerprint image. Further, according to various embodiments, the electronic device may identify directions where the positions of feature points change over time using the position information of the feature points, and may generate authentication information to be updated using the feature points acquired based on the identified position change direction.

Further, according to various embodiments of the present disclosure, when the authentication result is out of the authentication range and the authentication has successively failed, however the authentication result belongs within a predetermined threshold value range (threshold level) of the determination rejection, the electronic device may divide an area of the fingerprint image and compare similarity degrees between each area to identify whether a particular area has a similarity degree lower than other areas. When the similarity degree is lower at a particular area, the electronic device may determine that a fingerprint authentication is successfully performed. According to various embodiments, the electronic device may configure the authentication information using feature points in the remaining areas except for feature points at an area where the similarity degree for the fingerprints stored in the fingerprint information database is lower than other areas. In addition, the electronic device may acquire a reference feature point in areas where the similarity degree is higher than other areas, generate a fingerprint image based on the acquired reference feature point, and generate authentication information to be updated

TABLE 1

| | Time | | | | | | |
|---|---|---|---|---|---|---|---|
| | t1 | t2 | t3 | t4 | . . . | tn − 1 | tn |
| Fingerprint information | #1 Fingerprint information | #2 Fingerprint information | #3 Fingerprint information | #4 Fingerprint information | . . . | #n − 1 Fingerprint information | #n Fingerprint information |
| Similarity rate | 98% | 80% | 85% | 75% | . . . | 50% | 43% |

In operation 515, the electronic device may update the registered authentication information using the generated authentication information.

Further, according to various embodiments, evert time the particular event occurs, the controller 210 may generate authentication information using the stored at least one piece of fingerprint information and update the registered authentication information using the generated authentication information.

In addition, according to various embodiments, the electronic device may detect a plurality of feature points where the fingerprint information is the most duplicated, among feature points included in the stored fingerprint information, and may generate authentication information to be updated (for example, a fingerprint image, the position or type of the feature points of the fingerprint image) based on the detected by using the generated fingerprint image or fingerprint information that analyzed the generated fingerprint image.

According to various embodiments of the present disclosure, as a result of analyzing statistical information, when it is determined that the change in a fingerprint is large in a high-humidity season, the controller 210 may set a period for updating the registered authentication information to be shorter, on the other hand, in a dry season, the controller may set a period for updating the registered authentication information to be longer.

In addition, according to various embodiments of the present disclosure, the electronic device may divide the fingerprint information for the fingerprints of which authentication is successfully performed, by a specific condition (for example, at least one of a predetermined period of time, day, week, month, year, season or weather) and manage the divided fingerprint information.

Figure 9:
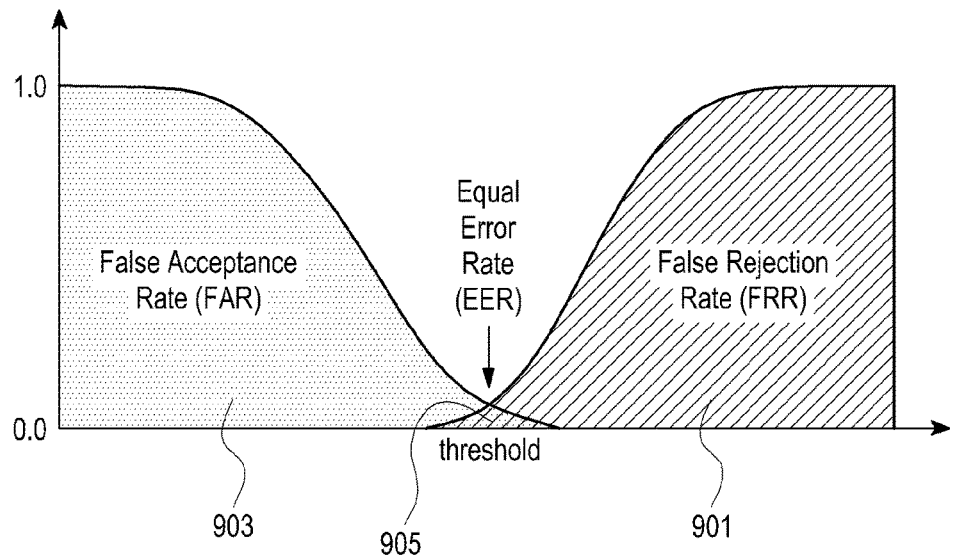
FIG. 9 is a diagram illustrating a graph related to fingerprint authentication of an electronic device according to various example embodiments of the present disclosure.
Figure 10:
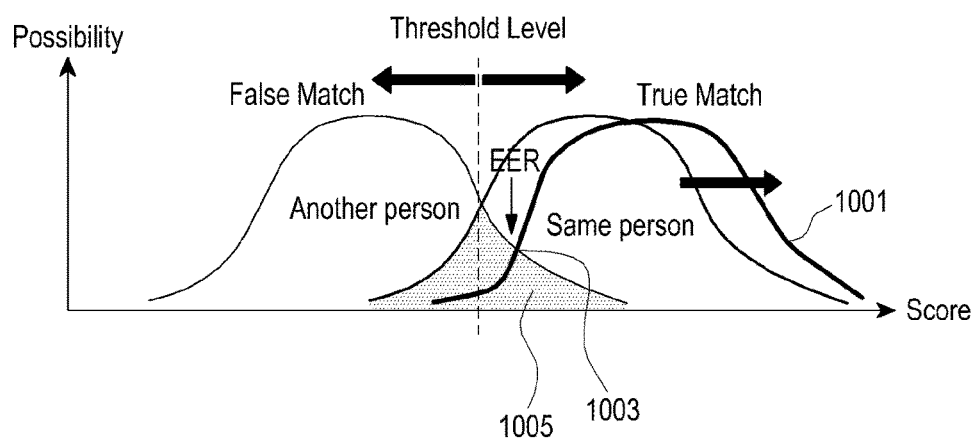
FIG. 10 is a diagram illustrating a graph related to fingerprint authentication of an electronic device according to various example embodiments of the present disclosure.

According to the fingerprint authentication operation procedure according to various embodiments of the present disclosure as described above, as illustrated in the accompanying FIG. 9, the electronic device may configure statistical graphs from the result of the fingerprint authentication when a service according to the user authentication is provided. The statistical graphs may illustrate a False Rejection Rate (FRR) 901 where the user authentication has failed and a False Acceptance Rate (FAR) 903 where another person is misinterpreted as the user himself, and a point where the FAR and the FRR cross each other may be represented by an Equal Error Rate (EER) 905, and the EER 905 can be represented as a threshold value to be used in the fingerprint authentication. Whenever recognizing fingerprints and performing the authentication thereof, the electronic device may accumulate the result of the recognized fingerprints authentication and perform statistical processing of the FRR, FAR, and EER. Further, the electronic device may increase the success rate of the fingerprint authentication by updating the registered authentication information using the similarity information on the fingerprint of which authentication is successfully performed. Thus, as illustrated above in FIG. 10, the first statistical graph (for example, a True Match statistical graph) 1001 may flexibly move over time and the EER 1003 can be lowered, and the threshold level of the determination rejection, that is, the rate of being accepted by another person can be lowered (indicated by reference numeral 1005).

Figure 11:
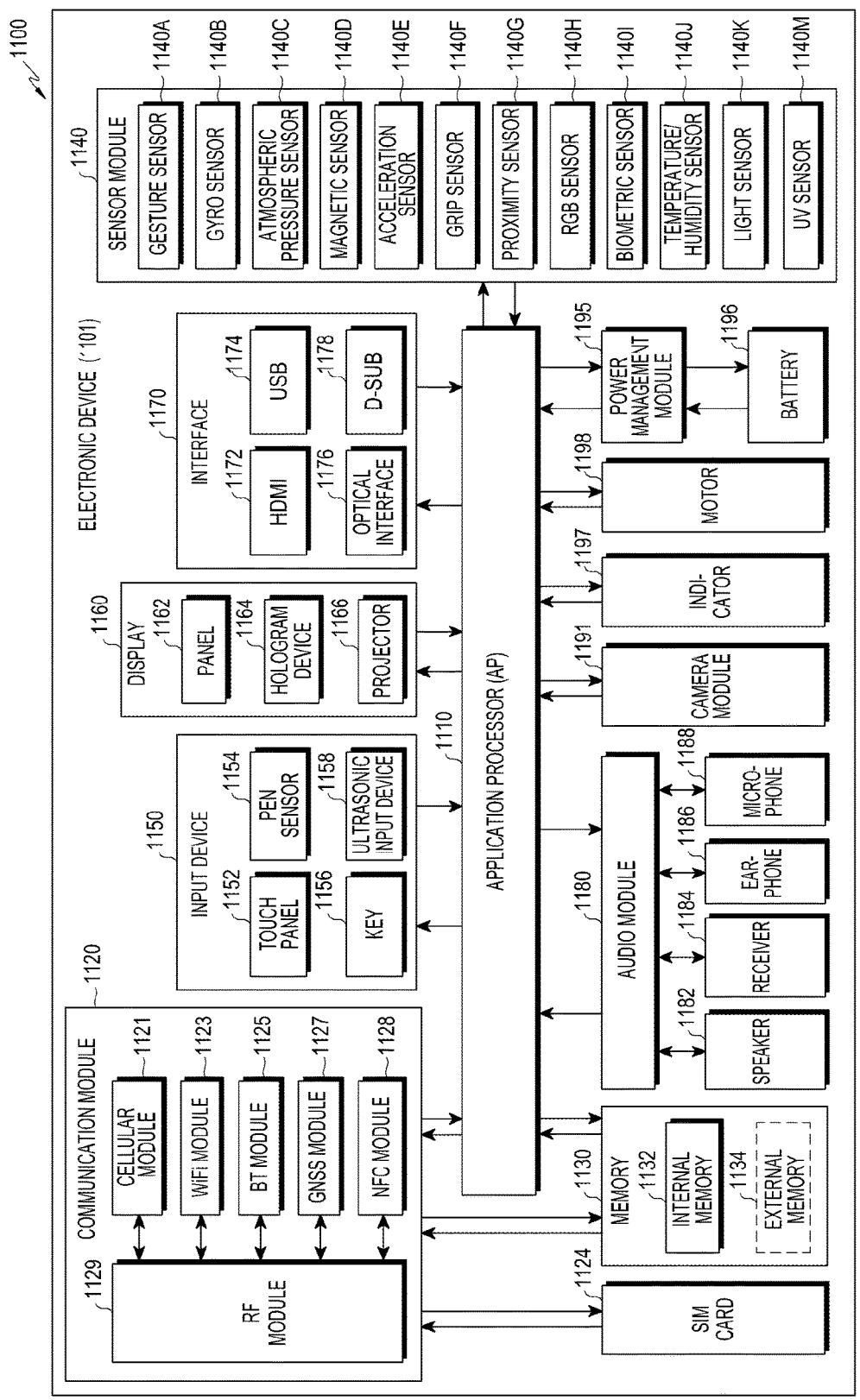
FIG. 11 is a block diagram of illustrating an example electronic device according to various example embodiments.

FIG. 11 is a block diagram illustrating an example electronic device 1101 according to various example embodiments. The electronic device 1101 may include, for example, the entirety or a part of the electronic device 101 illustrated in FIG. 1. The electronic device 1101 may include at least one Application Processor (AP) 1110, a communication module (e.g., including communication circuitry) 1120, a subscriber identification module 1124, a memory 1130, a sensor module 1140, an input device (e.g., including input circuitry) 1150, a display 1160, an interface (e.g., including interface circuitry) 1170, an audio module 1180, a camera module 1191, a power management module 1195, a battery 1196, an indicator 1197, and a motor 1198.

The processor 1110 may drive, for example, an operating system or application programs to control a plurality of hardware or software elements connected thereto and may perform various types of data processing and operations. The processor 1110 may be embodied, for example, as a System on Chip (SoC). According to an embodiment, the processor 1110 may further include a Graphic Processing Unit (GPU) and/or an image signal processor. The processor 1110 may also include at least some (e.g., a cellular module 1121) of the elements illustrated in FIG. 11. The processor 1110 may load, in a volatile memory, instructions or data received from at least one of the other elements (e.g., a non-volatile memory) to process the loaded instructions or data, and may store various types of data in the non-volatile memory.

The communication module 3120 may have a configuration that is the same as, or similar to, that of the communication interface 170 illustrated in FIG. 1. The communication module 1120 may include various communication circuitry, such as, for example, and without limitation, a cellular module 1121, a Wi-Fi module 1123, a Bluetooth module 1125, a GNSS module 1127 (e.g., a GPS module, a Glonass module, a Beidou module, or a Galileo module), an NFC module 1128, and a Radio Frequency (RF) module 1129.

The cellular module 1121 may provide, for example, a voice call, a video call, a text message service, an Internet service, etc. through a communication network. According to an embodiment, the cellular module 1121 may identify and authenticate the electronic device 1101 within a communication network using the subscriber identification module 1124 (e.g., a SIM card). According to an embodiment, the cellular module 1121 may perform at least some of the functions that the processor 1110 may provide. According to an embodiment, the cellular module 1121 may include a Communication Processor (CP).

The Wi-Fi module 1123, the BT module 1125, the GNSS module 1127, or the NFC module 1128 may include, for example, a processor for processing data that is transmitted and received through the corresponding module. According to some embodiments, at least some (two or more) of the cellular module 1121, the Wi-Fi module 1123, the Bluetooth module 1125, the GNSS module 1127, and the NFC module 1128 may be included in one Integrated Chip (IC) or IC package.

The RF module 1129, for example, may transmit/receive a communication signal (e.g., an RF signal). The RF module 1129 may include, for example, a transceiver, a Power Amplifier Module (PAM), a frequency filter, a Low Noise Amplifier (LNA), an antenna, etc. According to another embodiment, at least one of the cellular module 1121, the Wi-Fi module 1123, the BT module 1125, the GNSS module 1127, and the NFC module 1128 may transmit/receive an RF signal through a separate RF module.

The subscriber identification module 1124 may include, for example, a card that includes a subscriber identification module and/or an embedded SIM, and may contain unique identification information (e.g., an Integrated Circuit Card Identifier (ICCID)) or subscriber information (e.g., an International Mobile Subscriber Identity (IMSI)).

The memory 1130 (e.g., the memory 130) may include, for example, an internal memory 1132 or an external memory 1134. The internal memory 1132 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 1134 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 1134 may be functionally and/or physically connected to the electronic device 1101 through various interfaces.

The sensor module 1140 may, for example, measure a physical quantity or detect the operating state of the electronic device 1101, and may convert the measured or detected information into an electrical signal. The sensor module 1140 may include, for example, at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G a color sensor 1140H (for example, a red, green, blue (RGB) sensor), a biometric sensor 1140I, a temperature/humidity sensor 1140J, a light sensor 1140K, and a ultraviolet (UV) sensor 1140M. Additionally or alternatively, the sensor module 1140 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1140 may further include a control circuit for controlling one or more sensors included therein. In some embodiments, the electronic device 1101 may further include a processor configured to control the sensor module 1140 as a part of, or separately from, the processor 1110 and may control the sensor module 1140 while the processor 1110 is in a sleep state.

The input device 1150 may include various input circuitry, such as, for example, and without limitation, a touch panel 1152, a (digital) pen sensor 1154, a key 1156, or an ultrasonic input unit 1158. The touch panel 1152 may use, for example, at least one of a capacitive type, a resistive type, an infrared type, and an ultrasonic type. Furthermore, the touch panel 1152 may further include a control circuit. The touch panel 1152 may further include a tactile layer to provide a tactile reaction to a user.

The (digital) pen sensor 1154 may include, for example, a recognition sheet that is a part of, or separate from, the touch panel. The key 1156 may include, for example, a physical button, an optical key, or a keypad. The ultrasonic input device 1158 may detect ultrasonic waves, which are generated by an input tool, through a microphone (e.g., a microphone 1188) to identify data corresponding to the detected ultrasonic waves.

The display 1160 (for example, the display 160) may include a panel 1162, a hologram device 1164 or a projector 1166. The panel 1162 may have a configuration that is the same as, or similar to, that of the display 160 illustrated in FIG. 1. The panel 1162 may be implemented to be, for example, flexible, transparent, or wearable. The panel 1162, together with the touch panel 1152, may be implemented as one module. The hologram device 1164 may show a three-dimensional image in the air using an interference of light. The projector 1166 may display an image by projecting light onto a screen. The screen may be located, for example, in the interior of, or on the exterior of, the electronic device 1101. According to an embodiment, the display 1160 may further include a control circuit for controlling the panel 1162, the hologram device 1164, or the projector 1166.

The interface 1170 may include various interface circuitry, such as, for example, and without limitation, a High-Definition Multimedia Interface (HDMI) 1172, a Universal Serial Bus (USB) 1174, an optical interface 1176, or a D-subminiature (D-sub) 1178. The interface 1170 may be included, for example, in the communication interface 170 illustrated in FIG. 1. Additionally or alternatively, the interface 1170 may include, for example, a Mobile High-definition Link (MHL) interface, a Secure Digital (SD) card/Multi-Media Card (MMC) interface, or an Infrared Data Association (IrDA) standard interface.

The audio module 1180 may, for example, convert a sound into an electrical signal, and vice versa. At least some elements of the audio module 1180 may be included, for example, in the input/output interface 150 illustrated in FIG. 1. The audio module 1180 may process sound information that is input or output through, for example, a speaker 1182, a receiver 1184, earphones 1186, the microphone 1188, etc.

The camera module 1191 is a device that can photograph a still image and a moving image. According to an embodiment, the camera module 291 may include one or more image sensors (e.g., a front sensor or a rear sensor), a lens, an Image Signal Processor (ISP), or a flash (e.g., an LED or xenon lamp).

The power management module 1195 may manage, for example, the power of the electronic device 1101. According to an embodiment, the power management module 1195 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, the residual amount of the battery 1196 and a voltage, current, or temperature while charging. The battery 1196 may include, for example, a rechargeable battery and/or a solar battery.

The indicator 1197 may indicate a particular state (e.g., a booting state, a message state, a charging state, etc.) of the electronic device 1101 or a part (e.g., the processor 1110) thereof. The motor 1198 may convert an electrical signal into a mechanical vibration and may generate a vibration, a haptic effect, etc. Although not illustrated, the electronic device 1101 may include a processing unit (e.g., a GPU) for supporting mobile TV. The processing unit for supporting the mobile TV may process media data according to a standard, such as Digital Multimedia Broadcasting (DMB), Digital Video Broadcasting (DVB), MediaFlo™, etc.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 12:
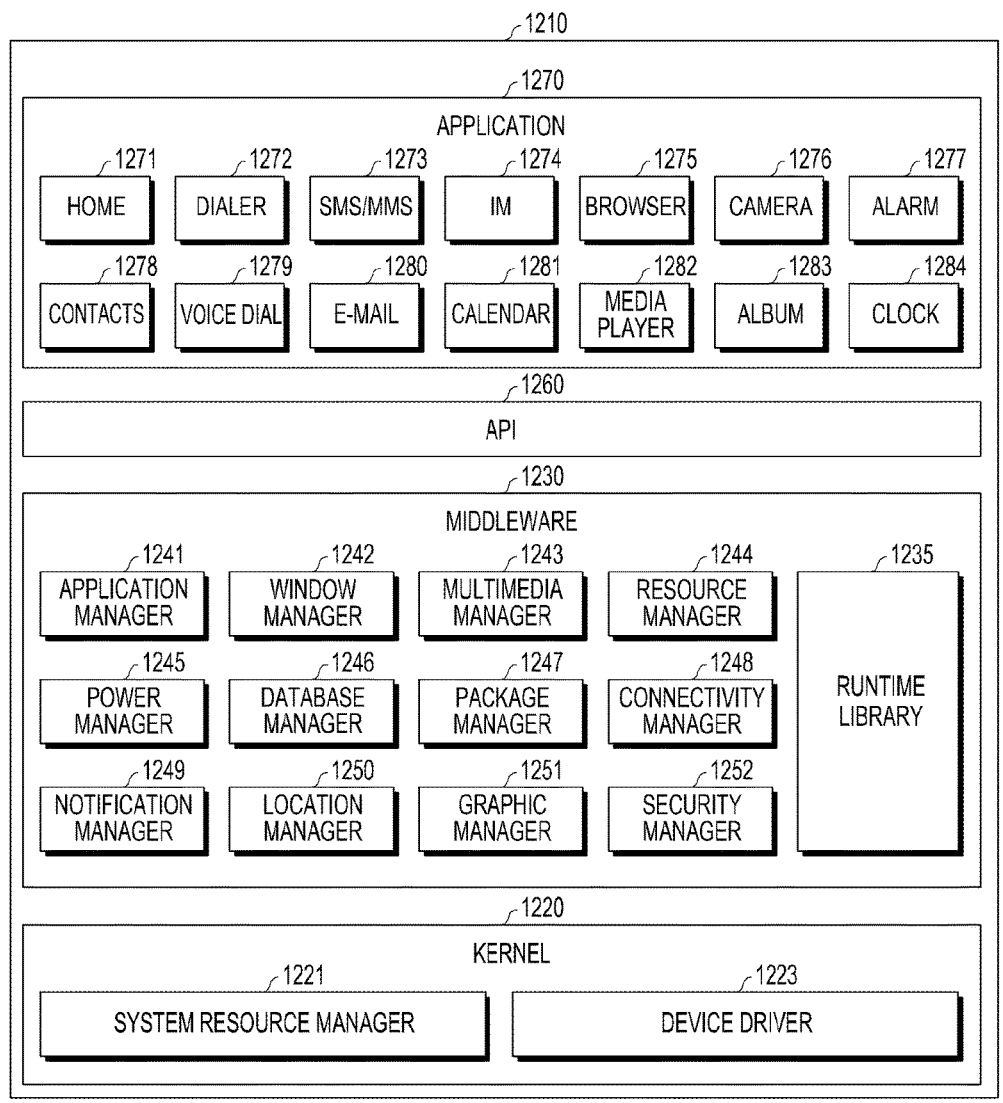
FIG. 12 is a block diagram illustrating an example program module according to various example embodiments.

FIG. 12 is a block diagram illustrating an example program module according to various example embodiments. According to an embodiment, the program module 1210 (e.g., the program 140) may include an Operating System (OS) that controls resources relating to an electronic device (e.g., the electronic device 101) and/or various applications (e.g., the application programs 147) that are executed in the operating system. The operating system may be, for example, Android, iOS, Windows, Symbian, Tizen, Bada, etc.

The program module 1210 may include a kernel 1220, middleware 1230, an Application Programming Interface (API) 1260, and/or applications 1270. At least a part of the program module 1210 may be preloaded on the electronic device, or may be downloaded from an external electronic device (e.g., the electronic device 102 or 104 or the server 106).

The kernel 1220 (e.g., the kernel 141) may include, for example, a system resource manager 1221 and/or a device driver 1223. The system resource manager 1221 may control, allocate, or retrieve system resources. According to an embodiment, the system resource manager 1221 may include a process manager, a memory manager, or a file system manager. The device driver 1223 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 1230 may provide a function required by the applications 1470 in common or provide various functions to the applications 1270 through the API 1260 so that the applications 1270 can efficiently use limited system resources within the electronic device. According to an embodiment, the middleware 1230 (for example, the middleware 143) may include, for example, at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235 may include, for example, a library module that a compiler uses in order to add a new function through a programming language while the applications 1270 are being executed. The runtime library 1235 may perform input/output management, memory management, the functionality for an arithmetic function, etc.

The application manager 1241 may manage, for example, the life cycle of at least one of the applications 1270. The window manager 1242 may manage Graphical User Interface (GUI) resources used on a screen. The multimedia manager 1243 may determine formats required to reproduce various media files and may encode or decode a media file using a coder/decoder (codec) appropriate for the corresponding format. The resource manager 1244 may manage resources, such as the source code, the memory, the storage space, and the like of at least one of the applications 1270.

The power manager 1245 may operate together with a Basic Input/Output System (BIOS) to manage a battery or power and may provide power information required for the operation of the electronic device. The database manager 1246 may generate, search for, and/or change a database to be used by at least one of the applications 1270. The package manager 1247 may manage the installation or update of an application that is distributed in the form of a package file.

The connectivity manager 1248 may manage a wireless connection, such as Wi-Fi, Bluetooth, etc. The notification manager 1249 may display or notify of an event, such as an arrival message, an appointment, a proximity notification, and the like, in such a manner that a user is not disturbed. The location manager 1250 may manage the location information of the electronic device. The graphic manager 1251 may manage a graphic effect to be provided to a user and a user interface relating to the graphic effect. The security manager 1252 may provide various security functions required for system security, user authentication, etc. According to an embodiment, in a case where the electronic device (e.g., the electronic device 101) has a telephone call function, the middleware 1230 may further include a telephony manager for managing a voice or video call function of the electronic device.

The middleware 1230 may include a middleware module that forms a combination of various functions of the above-described elements. The middleware 1230 may provide specialized modules according to the types of operating systems in order to provide differentiated functions. Furthermore, the middleware 1230 may dynamically remove some of the existing elements, or may add new elements.

The API 1260 (e.g., the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 1270 (e.g., the application programs 147) may include one or more applications that can perform functions, for example, home 1271, dialer 1272, SMS/MMS 1273, Instant Message (IM) 1274, browser 1275, camera 1276, alarm 1277, contacts 1278, voice dial 1279, e-mail 1280, calendar 1281, media player 1282, album 1283, clock 1284, health care (e.g., measuring exercise quantity or blood sugar), and environment information (e.g., atmospheric pressure, humidity, temperature information, etc.).

According to an embodiment, the applications 1270 may include an application (hereinafter, referred to as an "information exchange application" for convenience of description) that supports information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 103 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, etc.) that are provided by the external electronic device.

According to an embodiment, the applications 1270 may include applications (e.g., a health care application of a mobile medical appliance, etc.) that are specified according to attributes of an external electronic device (e.g., the electronic device 102 or 104). According to an embodiment, the applications 1270 may include applications that are received from an external electronic device (e.g., the server 106, or the electronic device 102 or 104). According to an embodiment, the applications 1270 may include preloaded applications or third-party applications that can be downloaded from a server. Names of the elements of the program module 1210, according to the above-described embodiments of the present disclosure, may change depending on the type of OS.

According to various example embodiments of the present disclosure, at least some of the program module 1210 may be implemented in software, firmware, hardware, or a combination of two or more thereof. At least some of the program module 1210 may be implemented (e.g., executed) by, for example, the processor (e.g., the processor 210). At least some of the program module 1210 may include, for example, a module, a program, a routine, a set of instructions, and/or a process for performing one or more functions.

The term "module" as used herein may, for example, refer to a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry (e.g., a CPU), an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute a function corresponding to the instruction. The computer-readable storage medium may be, for example, the memory 130.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a computer-readable recording medium having recorded therein a program for executing on a computer, wherein the program comprising executable instructions which, when executed by a processor, causes the processor to perform operations comprising: performing an authentication process for an input fingerprint based on registered authentication information; when the authentication for the input fingerprint is successfully performed, detecting similarity information for the input fingerprint; storing the detected similarity information in conjunction with an authentication time in a fingerprint information database; and updating the registered authentication information using the stored at least one piece of fingerprint information based on the similarity information stored in the fingerprint information database.

Various example embodiments disclosed herein are provided merely to aid in describing technical details of the present disclosure and to aid in the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
a memory including a fingerprint information database;
an input interface configured to receive fingerprint information of a fingerprint inputted by a user; and
a processor coupled to the memory and the input interface, the processor configured to:
when an authentication for the fingerprint information is successfully performed based on registered authentication information, generate similarity information of the fingerprint information,
control the memory to store the generated similarity information in conjunction with an authentication time of the received fingerprint information in the fingerprint information database,
when an event for identify a change in the fingerprint of the user occurs, obtain a plurality of fingerprint information stored in the fingerprint information database during a predetermined authentication time interval,
select at least one fingerprint information of the obtained plurality of fingerprint information based on the similarity information for each of the obtained plurality of fingerprint information, and
control to update the registered authentication information using the selected at least one fingerprint information.

2. The electronic device of claim 1, wherein the processor is configured to determine a matching score by comparing positions of feature points included in the authentication processed fingerprint information with positions of feature points included in the authentication information, and when the determined matching score is included in a predetermined range of authentication, to determine that authentication for the recognized fingerprint is successfully performed.

3. The electronic device of claim 1, wherein the processor is configured to delete the oldest fingerprint information stored in the fingerprint information database when the authenticated fingerprint information is stored in the fingerprint information database, and to perform statistical processing of fingerprint information accumulated in the fingerprint information database.

4. The electronic device of claim 1, wherein the similarity information includes at least one of a matching score that is acquired by comparing fingerprint information for the authenticated fingerprints with the registered authentication information, a similarity rate, and a position of a feature point.

5. The electronic device of claim 1, wherein the processor is configured to detect a lowest degree of similarity information or similarity information lower than a threshold value among multiple pieces of similarity information stored in the fingerprint authentication database, and to generate new authentication information to update the registered authentication information using at least one piece of fingerprint information selected based on the detected similarity information.

6. The electronic device of claim 1, wherein, when the event occurs to update the registered authentication information based on at least one of time, a surrounding environment, and a fingerprint state, the processor is configured to generate new authentication information to update the registered authentication information based on the multiple pieces of similarity information stored in the fingerprint information database.

7. The electronic device of claim 1, wherein, when the similarity information is included in a predetermined range of a threshold value, the processor is configured to divide an area of a fingerprint image for the recognized fingerprint and to compare similarities of each divided area to re-determine matching scores of remaining areas except for an area having a low degree of similarity, and when the re-determined matching score is included in the authentication range, to determine that the authentication is successfully performed.

8. The electronic device of claim 1, wherein the processor is configured to cause authentication information to be updated in a direction in which the most accumulated feature points change among the fingerprint information accumulated in the database, and to control the electronic device to update the registered authentication information using the authentication information.

9. A method for authenticating a fingerprint in an electronic device, the method comprising:
receiving, by an input interface of the electronic device, fingerprint information of a fingerprint inputted from a user;
performing an authentication process for the received fingerprint information based on registered authentication information;
when authentication of the fingerprint information is successfully performed, generating similarity information of the fingerprint information the input fingerprint;
controlling a memory of the electronic device to store the generated similarity information in conjunction with an authentication time of the received fingerprint information in a fingerprint information database of the memory;
when an event for identify a change in the fingerprint of the user occurs, obtaining a plurality of fingerprint information stored in the fingerprint information database during a predetermined authentication time interval;
selecting at least one fingerprint information of the obtained plurality of fingerprint information based on the similarity information for each of the obtained plurality of fingerprint information; and
controlling to update the registered authentication information using the selected at least one fingerprint information.

10. The method of claim 9, wherein performing the authentication process for the recognized fingerprint comprises:
determining a matching score by comparing positions of feature points included in the authentication processed fingerprint information with positions of feature points included in the authentication information, and
when the determined matching score is included in a predetermined authentication range, determining that the authentication for the recognized fingerprint is successfully performed.

11. The method of claim 9, further comprising: deleting oldest fingerprint information stored in the fingerprint information database when fingerprint information of the input fingerprint for which authentication is successfully performed is stored in the fingerprint information database.

12. The method of claim 9, wherein the similarity information includes at least one of a matching score that is acquired by comparing fingerprint information for the authenticated fingerprints with the registered authentication information, a similarity rate, and a position of a feature point.

13. The method of claim 9, wherein further comprising:
detecting a lowest degree of similarity information or similarity information lower than a threshold value among multiple pieces of similarity information stored in the fingerprint authentication database; and
generating new authentication information to update the registered authentication information using at least one piece of fingerprint information selected based on the detected similarity information.

14. The method of claim 13, wherein further comprising:
when the event occurs to update the registered authentication information based on at least one of time, a surrounding environment, and a fingerprint state, generating new authentication information to update the registered authentication information based on multiple pieces of similarity information stored in the fingerprint information database.

15. The method of claim 9, wherein
the selected at least one fingerprint information is at least one of the most recently stored information, at least one piece of fingerprint information stored for a predetermined time, fingerprint information corresponding to similarity information having the lowest degree of similarity that is stored for a predetermined time, and fingerprint information corresponding to similarity information having a higher frequency for a predetermined time.

16. The method of claim 9, wherein the performing the authentication process for the recognized fingerprint comprises:
when a matching score of the authentication processed fingerprint information is included in a predetermined range of threshold value, dividing an area of a fingerprint image for the recognized fingerprint;
comparing similarities between divided areas to re-determine matching scores of remaining areas except for an area having a low degree of similarity; and
when the re-determined matching score is included in the authentication range, determining that the authentication is successfully performed.

17. A non-transitory computer-readable recording medium having recorded therein a program comprising executable instructions which, when executed by a processor, causes the processor to perform operations comprising:
receiving, by an input interface of the electronic device, fingerprint information of a fingerprint inputted from a user;
performing an authentication process for the received fingerprint information based on registered authentication information;
when authentication of the fingerprint information is successfully performed, generating similarity information of the fingerprint information the input fingerprint;
controlling a memory of the electronic device to store the generated similarity information in conjunction with an authentication time of the received fingerprint information in a fingerprint information database of the memory;

when an event for identify a change in the fingerprint of the user occurs, obtaining a plurality of fingerprint information stored in the fingerprint information database during a predetermined authentication time interval;

selecting at least one fingerprint information of the obtained plurality of fingerprint information based on the similarity information for each of the obtained plurality of fingerprint information; and controlling to update the registered authentication information using the selected at least one fingerprint information.

* * * * *